Nov. 16, 1948.   J. A. E. MADORE   2,453,998
DRAFT CONNECTOR
Filed April 17, 1947
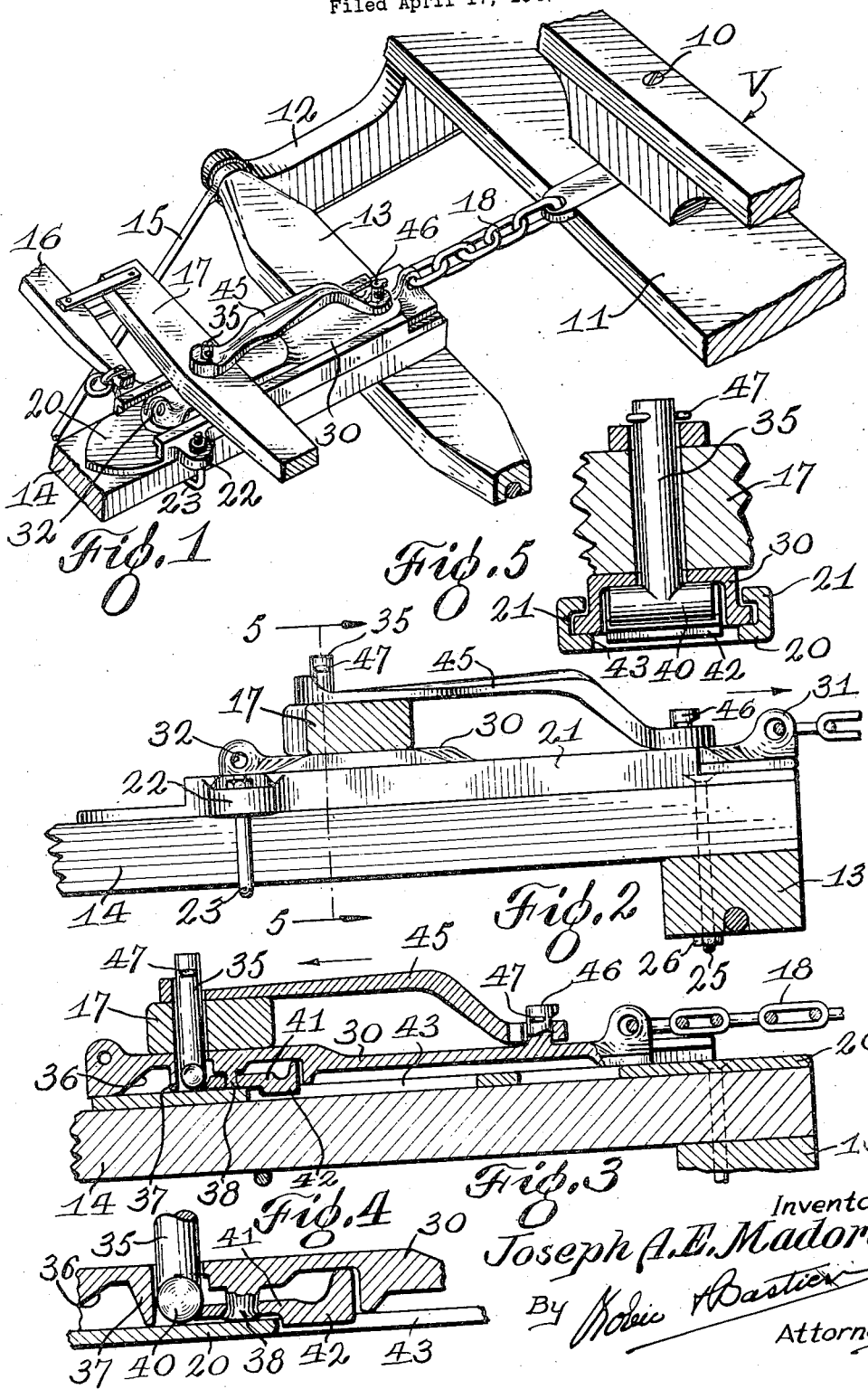
Inventor
Joseph A. E. Madore Patented Nov. 16, 1948

2,453,998

UNITED STATES PATENT OFFICE 2,453,998

DRAFT CONNECTOR

Joseph A. E. Madore, Montreal, Quebec, Canada

Application April 17, 1947, Serial No. 741,992

3 Claims. (Cl. 278—90)

The present invention relates to a draft connection and, more particularly, such a connection for winter vehicles, having runners, which invention is an improvement over my United States Patent 1,821,762, dated September 1, 1931.

The main object of the invention resides in the provision of a draft connection for such vehicles which is very efficient to transmit the animal traction, or the like, directly to the frame of the vehicle.

Another object is the provision of a draft connection wherein the draft pole is absolutely devoid of connection holes or apertures tending to decrease its strength.

Another important object is the provision of means of the character described applicable without difficulty to existing vehicles.

Still another object of the invention contemplates a mechanism which is rugged and of moderate cost intended to improve the steering of winter runner vehicles.

Other objects and advantages of the invention will become apparent, or will be particularly pointed out, during the description to follow.

As an example and for purposes of illustration only an embodiment of the invention is shown in the annexed drawing wherein:

Figure 1 is a perspective view of the invention adapted to a sleigh;

Figure 2 is an elevation side view of the mechanism proper;

Figure 3 is a longitudinal section of said mechanism;

Figure 4 is a longitudinal partial and enlarged section of the left part of Figure 3; and Figure 5 is a detailed partial section of the king pin taken along the line 5—5 of Figure 2.

In the annexed drawing, wherein the same reference numerals indicate corresponding parts throughout, the letter V designates generally, in Figure 1, the frame of the vehicle, which frame is supported and pivoted at 10 to a cross-beam 11 connecting together the two runners 12, one of which is shown in said figure for purposes of simplification. According to established practice, the front of the runners is connected together by a transverse pole or tong bar 13 to which a draft pole 14 is attached, the said bar being reinforced by braces 15.

Contrary to the general arrangement wherein the swingletrees 16 and the doubletree 17 are secured directly to the draft pole, the device of the invention contemplates an independent connection of the draft pole, slidable thereover, and connecting directly by means of a chain 18 the frame of a vehicle so as to transmit directly thereto the draft exerted on the pole 17 by the draft animals or the like. Thus, the draft pole is only used to exert on the runners the required direction and, furthermore, liberate said runners of any stress tending to kick-up the same and leave them free to follow the irregularities of the ground.

The device of the invention consists of an elongated base 20 the lateral sides of which are provided with a flange 21 forming slides, said base having at the front thereof lateral ears 22 drilled to receive the ends of an inverted U-bracket 23 straddling the bottom of the pole and provided to secure the base 20 thereto, thereby avoiding drilling said holes and thus weakening the same. As additional securing means, a bolt 25 is passed through the rear end of the base and pole, as well as the pole bar 13, to connect the three elements together and tighten the same by means of the nut 26; consequently, the base of the device is solidly secured to the pole and to the tong bar, as illustrated more particularly in Figures 1, 2 and 3.

Longitudinally movable inside the base, in the slides 22, there is a slider 30 having an eye 31 at its rear part and another eye 32 at its front part, the eye 31 being provided to receive one end of the chain 18 the other end of which chain is attached by suitable means to the frame of the vehicle as shown in Figure 1. The eye 32 is intended to receive, if necessary, an auxiliary chain to which an additional team of horses or animals can be hitched if an extra heavy load is to be pulled. The front end of the slider is provided to receive the doubletree 17 and, for that purpose, a king pin 35 is provided at the front of the slider as will be described later on, this king pin acting as a pivot for the doubletree to which are attached the swingletrees 16, as explained above, the draft imparted to the doubletree being directly transmitted therefrom to the slider and, thereafter, to the chain 18, the above elements being independent to the draft pole since they can slide freely with respect to said pole.

As clearly illustrated in Figures 3 and 4, the front of the slider is formed with an under cavity 36 having a dependent lip 37 and an integral pin 38, this lip and pin extending downwardly from the upper part of the cavity 36. The lip 37 acts as an abutment for the lower portion of the pin 35, this lower portion 40 being constituted by a transverse cylinder the ends of which are extended laterally beyond the axis of the king pin to form a base abutting against the lip 37 and which prevents, at the same time, the retraction of the pin upwardly (see Figure 5). The base 40 is retained, on the side opposite the lip 37, by a plate 41 retained in the cavity 36 by the riveted head of the pin 38. This plate includes furthermore a lower enlargement 42 extending downwardly in a longitudinal slot 43 provided in the center of the base 20, which slot has for effect to limit, by means of the enlargement 42 above acting as abutment, the translation movement of the slider 30 in the slides of the base 20. Thus, in the advent of the breakage of chain 18, the slider cannot escape completely from its slide and the disastrous effect so caused absolutely prevented.

In order to prevent bending stress being applied to the king pin above the slider whenever a traction is exerted on the doubletree 17, the upper part of the king pin is maintained in horizontal position by means of a bracket 45 one end of which engages the king pin and the other end held by a post 46 integral to the slider, at the back thereof, cotter pin 47 retaining the bracket to the king pin and the post, respectively.

Consequently the said king pin is held at both ends thereof securely to the slider and any tension applied to the doubletree distributed uniformly along the king pin.

From the foregoing, it is clear that the invention is an improvement in the art of draft devices in that it permits improving the steering of sleighs and other horse drawn vehicles of the same type.

According to the invention the unavoidable shocks caused by animal traction on ground which is often unequal, are transmitted to the vehicle independently of the draft pole which is consequently liberated of the stresses inherent to said traction, the said pole having for its sole function to insure the steering of the vehicle. Furthermore, the traction not being applied to the front of the sleigh of the runners, as is generally the case, the said runners can more easily follow the irregularities of the ground and an important advantage, do not have this tendency to kick-up and to bear on the heels thereof. Finally, the steering mechanism, runners pivoting and connections between said runners and the pole not having to sustain the traction stresses, the design of the said elements can be modified to render them more efficient for their function while reducing their weight and mass.

Although the annexed drawing, as well as the description thereof, have mentioned mostly a horse drawn vehicle and a doubletree, it is evident that while still remaining within the spirit of the invention a swingletree only can be used or, in certain cases, a tractor or other vehicle can be used for traction without in any case modifying the essential device of the invention, the doubletree only having to be changed.

It must be understood that various changes in the shape, size and arrangement of parts may be resorted to without departing from the spirit of the invention or the scope of the subjoined claims.

Having thus described my invention, I claim:
1. A traction device for vehicles having a draft pole, a doubletree and a frame, a slider movable longitudinally on the pole, a king pin secured to the slider, a bracket connecting the free end of this pin to the rear of the slider, said king pin receiving the doubletree, and a chain connecting the slider to the frame of the vehicle.
2. In a device as claimed in claim 1, a base having slides secured to the draft pole, this base acting as a support for the slider and of means to limit the free travel thereof.
3. In a device as claimed in claim 1, means in the slider to retain the king pin vertical and to prevent its withdrawal downwardly.

JOSEPH A. E. MADORE.

REFERENCES CITED

The following references are of record in the file of this patent:

UNITED STATES PATENTS

| Number | Name | Date |
|---|---|---|
| 197,986 | Whipple | Dec. 11, 1877 |